United States Patent [19]
Willis et al.

[11] Patent Number: 5,454,574
[45] Date of Patent: Oct. 3, 1995

[54] COMPOSITE POWDERED METAL COMBUSTION SEAL RING

[75] Inventors: Harry G. Willis, Jr., Coal City; Mark M. Shuster, Lisle, both of Ill.

[73] Assignee: Dana Corporation, Toledo, Ohio

[21] Appl. No.: 993,215

[22] Filed: Dec. 18, 1992

[51] Int. Cl.$^6$ .................................................. F16J 15/06
[52] U.S. Cl. ..................... 277/235 B; 277/180; 277/234; 277/235 R
[58] Field of Search ..................... 277/180, 233, 277/234, 235 R, 235 B, 236

[56] References Cited

U.S. PATENT DOCUMENTS

| | | | |
|---|---|---|---|
| 2,455,982 | 12/1945 | Dowty | 285/910 X |
| 3,355,181 | 1/1967 | Olson | 277/180 |
| 3,467,398 | 12/1967 | Bernard | 277/180 |
| 3,561,793 | 2/1971 | Rode | 277/180 X |
| 3,606,361 | 9/1971 | Pohl et al. | 277/235 B |
| 3,618,960 | 11/1971 | Koehler | 277/236 X |
| 3,722,898 | 3/1973 | von Benningsen | 277/206 |
| 3,917,294 | 11/1975 | Abbes et al. | 277/180 |
| 3,929,533 | 12/1975 | Horn | 277/235 B X |
| 3,986,721 | 10/1976 | Decker | 277/166 |
| 4,026,565 | 5/1977 | Jelinek | 277/180 |
| 4,335,890 | 6/1982 | Nicholson | 277/235 B |
| 4,477,087 | 10/1984 | Sutter, Jr. et al. | 277/236 X |
| 5,076,592 | 12/1991 | Pearlstein | 277/235 B X |

FOREIGN PATENT DOCUMENTS

| | | | |
|---|---|---|---|
| 1257341 | 9/1986 | U.S.S.R. | 277/234 |
| 1273407 | 5/1972 | United Kingdom | 277/235 B |

OTHER PUBLICATIONS

Structure and Properties of Engineering Alloys, William F. Smith, Copyright 1981, pp. 451 and 454.

*Primary Examiner*—William A. Cuchlinski, Jr.
*Assistant Examiner*—John L. Beres
*Attorney, Agent, or Firm*—Dykema Gossett

[57] ABSTRACT

An annular combustion seal ring for an engine gasket includes a central section having a generally circular cross-section and at least one tab section extending radially away from the central section. The ring is formed from a homogeneous composite powdered metal with material zones of varying densities. The composite powdered metal combustion seal ring has numerous advantages. Not only is it possible to design and manufacture a ring having a desired yield strength in both the vertical and hoop directions, but the stiffness along a particular axis may be selectively varied as a function of seal loading. Also, the varying density zones may provided by layers of material. In other aspects of the invention, the powdered metal may be primarily titanium with trace elements of the composite powdered metal providing lubrication to reduce the coefficient of friction at the ring's outer surface.

18 Claims, 1 Drawing Sheet

COMPOSITE POWDERED METAL COMBUSTION SEAL RING

BACKGROUND OF THE INVENTION

The present invention relates to a combustion seal ring having a layered composite powdered metal construction for use with a cylinder head gasket.

A cylinder head gasket bears a clamping load from a bolted connection of a cylinder head and an engine block and relies upon that load to provide a seal against the sealing elements of the gasket.

Several types of combustion seal rings are known. One type, known as a yieldable combustion seal ring, is essentially comprised of a wire having a generally circular cross-sectional area. A clamping force applied to such a ring is concentrated at the point of contact, deforming the ring's circumference to effectively seal out combustion gases. This type of seal ring, however, is subject to thermal crushing which results from plastic deformation which tends to occur under high temperature operation during the life of the ring.

To address the thermal crushing problem, a "thermal stop" combustion seal ring is sometimes used. This "thermal stop" seal ring has a generally rectangular cross-sectional area, which is more resistant to thermal crushing because of the increased surface area upon which a clamping load acts. One disadvantage of this particular type of ring, however, is that due to its large surface area and lack of point loading, it has very poor deformability.

To overcome disadvantages of the yieldable combustion seal ring and the "thermal stop" combustion seal ring, a combustion seal ring is known which has a central section of generally circular cross-section and a single tab section of generally rectangular cross-section extending radially outwardly away from the central section. It is also known to use a first metal for the central section and a second metal for the tab section.

This type of seal ring is still subject to numerous disadvantages. The use of two separate metals complicates manufacture. Such a ring also requires a compromise between a desired vertical compressive yield strength and a hoop yield strength. Hoop yield strength is measured tangentially to the ring's circumference and should be sufficiently high to withstand the internal cylinder pressures produced during engine operation. If a ring does not have adequate hoop strength, it will tend to expand allowing combustion gases to leak. At the same time, however, a low vertical yield strength is desirable to provide a deformable seal ring which completely seals against the leakage of combustion gases. Further, with such prior art seal rings stiffness may not be selectively varied along a selected axis to increase the flexibility of the ring. Additionally, the use of a single radially inwardly extending tab section may not provide sufficient hoop strength to resist gas blow out forces.

SUMMARY OF THE INVENTION

An annular combustion seal ring for an engine includes a central section having a solid generally circular cross-section and at least one tab section extending radially away from the central section. The ring is formed from a homogeneous composite powdered metal which forms zones of varying densities after sintering. In one preferred form, the powdered metal is composed primarily of titanium.

It is possible to vary the size, composition, and orientation of the zones of varying densities. Therefore, with the disclosed composite powdered metal combustion seal ring it is possible to design and manufacture a ring having a desired yield strength in both the vertical and hoop directions, wherein the stiffness along a particular axis may be selectively varied as a function of seal loading. Because of the generally circular cross-section of the central section, high stress levels will exist at initial assembly to allow local yielding of the ring. This yielding provides ring conformability to ensure a good initial seal around the circumference of the ring. Yet, the variable spring rate may be used to restrict further yielding as compared to a yieldable seal ring of a fixed spring rate.

Further, while made primarily of titanium, trace elements of the composite powdered metal provide lubrication, reducing the coefficient of friction at the ring's outer surface. This lubrication is very important to prevent undesirable scouring. If the ring is used with a flange then abrasive action can reduce the thickness of the legs, leading to flange cracking. If a flange is not used, the abrasive action between the mechanical components and the ring can result in leakage paths for the combustion gases.

A first disclosed embodiment includes a high strength material zone in an inner core of a central section and a soft material zone in an outer layer about the inner core and a tab section. A second disclosed embodiment includes a multiple layer laminate with a plurality of high strength material zones alternating with a plurality of soft material zones. If different strengths or stiffnesses are required, the orientation, number or thickness of these zones may be varied. At least one high strength material zone preferably extends radially through each of the annular sections comprising the central section and tab section. A third disclosed embodiment includes two tab sections, providing additional hoop strength against combustion gas blow out pressures.

BRIEF DESCRIPTION OF THE DRAWINGS

The features and inventive aspects of the present invention will become more apparent upon reading the following detailed description, claims, and drawings, of which the following is a brief description:

DESCRIPTION OF A DETAILED EMBODIMENT

Figure 1:
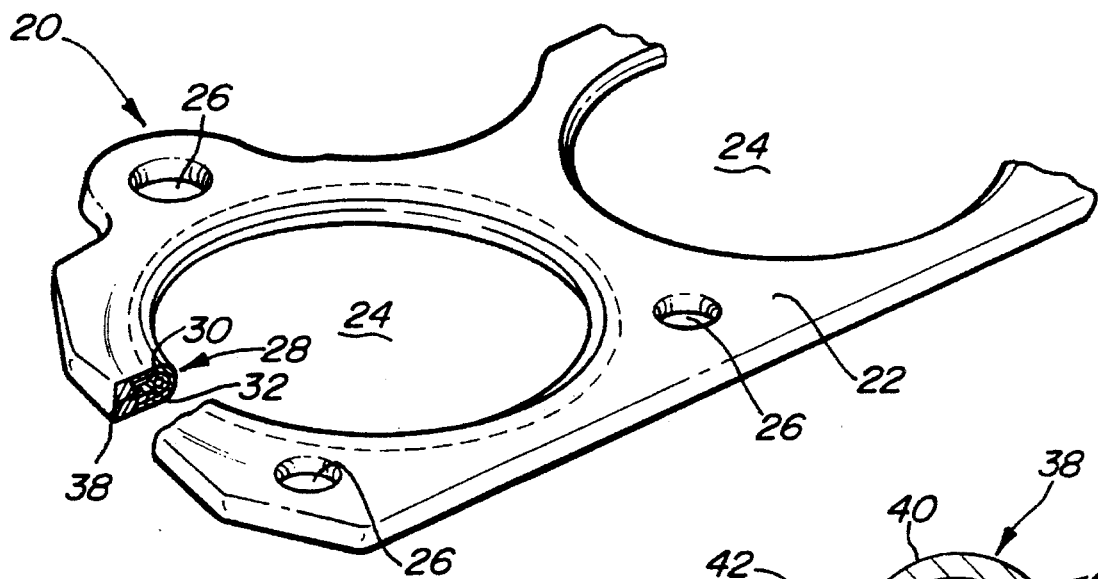
FIG. 1 is a perspective view of a portion of a gasket incorporating the present invention.

A cylinder head gasket 20 illustrated in FIG. 1 includes a gasket body 22, cylinder apertures 24, and fluid flow openings 26. To protect gasket body 22 from combustion gases and provide a seal about a cylinder bore (not shown), gasket 20 includes an annular U-shaped flange 28 with legs 30 and 32 and a combustion seal ring 38 disposed within flange 28.

Figure 2:
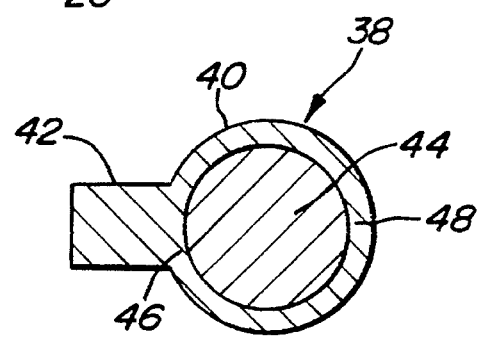
FIG. 2 is a cross-sectional view of a first embodiment of a combustion seal ring according to the present invention.

As illustrated in FIG. 2, seal ring 38 includes a central annular section 40 having a generally circular cross-section and an annular tab section 42 extending radially outwardly from central section 40. These annular sections extend in a radial plane. Central section 40 provides a primary combustion seal while tab section 42 provides both a secondary combustion seal and additional hoop stress support against combustion gas blow out pressures. Ring 38 is preferably formed from a composite powdered metal and includes a separate high strength material inner core 44. A soft material zone 46 extends as an outer layer 48 about the periphery of central section 40 and the entirety of tab section 42. Inner core 44 preferably has a porosity of approximately 0 percent and soft material zone 46 has a porosity between 3 and 60 percent and preferably between 15 and 30 percent. Ring 38 is impermeable to combustion gases.

The inventive seal ring having zones of varying densities provides numerous advantages, including the ability to vary the strength of the seal ring simultaneously in both the vertical and hoop directions. A material yield strength along the vertical axis has a range between 10 and 120 kpsi, and preferably between 25 and 43 kpsi. The range results in a deformable central section 40 which provides a good primary combustion seal around the circumference of seal ring 38. A preferred value is approximately 25 kpsi. At the same time, however, it is generally desirable to have a hoop yield strength between 100 and 200 kpsi along the hoop axis, and preferably between 100 and 160 kpsi. A preferred value is approximately 160 kpsi to ensure that the seal ring can withstand high internal cylinder pressures produced during engine operation.

Another advantage of zones with varying densities is that a variable spring rate may be created within the ring, meaning that a stiffness along a selected axis may be varied as a function of seal ring loading. For example, as the vertical load is increased, ring 38 will become stiffer, resisting thermal crushing while still providing a desirable combustion seal in a manner similar to that of a yieldable seal ring. The additional stiffness lessens the likelihood of plastic deformation, allowing the ring to recover its shape as a function of the Modulus of Elasticity.

Figure 3:
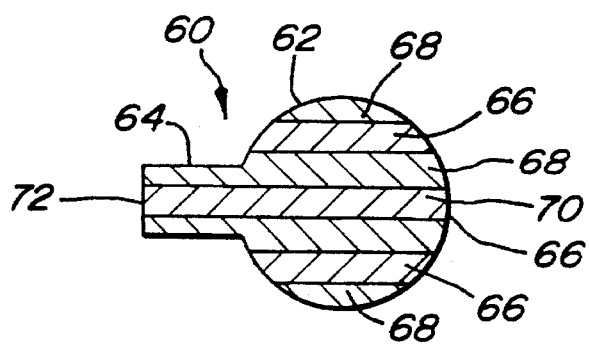
FIG. 3 is a cross-sectional view of a second embodiment of a combustion seal ring.

A second embodiment, combustion seal ring 60 illustrated in FIG. 3, includes a central section 62 and a tab section 64. This seal ring includes a multiple layer laminate with a plurality of high strength material zones 66 alternating with a plurality of soft material zones 68. Preferably, zones 66 and 68 extend radially outwardly from an inner peripheral extremity 70 to an outer peripheral extremity 72 of seal 60 with at least one high strength zone 66 extending radially through each of the annular sections. It is also preferred that a soft material zone 68 be at each vertical extremity of central section 62 to improve conformability under initial loading conditions. It is expected that ring 60 will generally be either a three or five layer laminate, although a seven layer laminate is illustrated.

Figure 4:
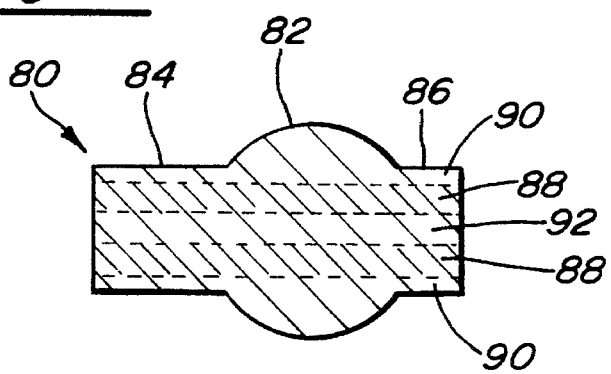
FIG. 4 is a cross-sectional view of a third embodiment of a combustion seal ring.

A third embodiment, combustion seal ring 80 illustrated in FIG. 4, includes a central section 82 and two tab sections 84 and 86. Tab section 84 extends radially outwardly from central section 82, while tab section 86 extends radially inwardly from it. Tab section 86 supplements tab section 84 to increase the hoop strength of ring 80 against cylinder gas blow out pressures. A further advantage is that the presence of two tabs reduces residual stress within central section 82 during part formation, reducing the possibility of a manufacturing failure. Seal ring 80 is illustrated having two high strength material zones 88 and two outer facing soft material zones 90 and an inner soft material zone 92. The increased cross-sectional area of zones 90 at the vertical extremities of central section 82 allows for even greater deformabillty of the seal ring. As with seal ring 60, it is preferred that at least one high strength material zone extend through each of the sections.

While in the preferred embodiments of combustion seal rings 38, 60, and 80, a powdered metal primarily comprises titanium, it may also include between 2 and 6 percent aluminum, 1 and 6 percent vanadium, 0.5 and 4 percent iron and between 1 and 6 percent molybdenum. The aluminum and vanadium add to the titanium's structural strength. The combination of iron and molybdenum increase the strength of the powdered metal at high temperatures while simultaneously reducing the coefficient of friction at the seal ring's outer surface. Most of the iron and molybdenum react with the rest of the powder, but some is deposited as a residue providing a lubricant. The lower coefficient of friction of the composite metal resulting from the lubricant is beneficial in overcoming the abrasive nature of pure titanium. On the other hand, if too much iron is used, the resulting material may be too brittle, reducing the deformability of the resulting seal ring.

One possible method of manufacture includes placing the composite powdered metal in a graphite fixture which is then heated using known sintering techniques. The type of fixture used and the method of heating can be controlled, as known to those skilled in the art, to result in a separation of the homogeneous powdered metal into the desired material zones. Typically, a homogeneous composite metal is placed in a fixture and heated at preselected temperatures and times.

Although the disclosed zones are preferably achieved from a homogeneous material, distinct materials may also be laminated together to achieve the hard and soft zones.

Preferred embodiments of the present invention have been described. It is to be understood that variations and modifications may be employed without departing from the scope of the present invention. Accordingly, the following claims should be studied to determine the true scope of the present invention.

We claim:

1. A combustion seal ring for an engine comprising:
a plurality of annular sections including a central section having a generally circular cross-section and at least one tab section extending radially away from said central section, said ring formed from a composite powdered metal having material zones of varying densities, first means for providing hoop strength to said ring, said first means including at least one high strength region formed in a zone of high density, and second means for allowing deformation of said ring to promote sealing, said second means including a low strength region formed in a zone of low density, wherein the orientation and number of said high and low strength regions are varied to provide selective stiffness to said ring.

2. A combustion seal ring as recited in claim 1, wherein said powdered metal is comprised primarily of titanium.

3. A combustion seal ring as recited in claim 2, wherein said powdered metal also includes preselected amounts of aluminum, vanadium, iron, and molybdenum.

4. A combustion seal ring as recited in claim 1, wherein said varying density zones include a high strength material zone having a porosity of approximately 0 percent and a soft material zone having a porosity between 3 and 60 percent.

5. A combustion seal ring as recited in claim 4, wherein said ring has a yield point between 100 and 200 kpsi along a hoop axis tangential to a circumference of said ring, and a compressire yield point between 10 and 120 kpsi along an axis perpendicular to a radial axis and said hoop axis.

6. A combustion seal ring as recited in claim 4, wherein said high strength material zone comprises an inner core of said central section and said soft material zone comprises an outer layer of said central section and comprises said tab section.

7. A combustion seal ring as recited in claim 4, wherein said ring includes a multiple layer laminate with said high strength material zone extending radially and axially alternating with a plurality of said soft material zones.

8. A combustion seal ring for an engine comprising:

an annular section having a generally circular cross-section, there being layers alternating in the axial direction of relatively high strength material and relatively low strength material, said layers extending radially through said entire cross-section.

9. A combustion seal ring as recited in claim 8, wherein the outermost of said layers are of said relatively soft material.

10. A combustion seal ring as recited in claim 8, wherein said layers are formed from a homogeneous powdered metal.

11. A combustion seal ring for an engine comprising:

a plurality of annular sections including a central section having a generally circular cross-section and at least one tab section extending radially away from said central section, said ring formed from a composite powdered metal having material zones of varying densities, wherein said varying density zones include a high strength material zone having a porosity of approximately 0 percent and a soft material zone having a porosity between 3 and 60 percent, said ring including a multiple layer laminate with said high strength material zone extending radially and axially alternating with a plurality of said soft material zones.

12. A combustion seal ring as recited in claim 11, wherein said laminate layers extend radially outwardly from an inner peripheral extremity to an outer peripheral extremity of said ring.

13. A combustion seal ring as recited in claim 11, wherein said high strength material zone extends radially through each of said annular sections.

14. A combustion seal ring for an engine comprising:

a plurality of annular sections including a central section having a generally circular cross-section and at least one tab section extending radially away from said central section, said ring formed from a composite powdered metal having material zones of varying densities, first means for providing hoop strength to said ring, said first means including at least one high strength region formed in a zone of high density, and second means for allowing deformation of said ring to promote sealing, said second means including a low strength region formed in a zone of low density, wherein said ring includes two of said tab sections with a first tab section extending radially outwardly from said central section and a second tab section extending radially inwardly from said central section.

15. A combustion seal ring as recited in claim 14, wherein said first tab section has a first radial length and said second tab section has a second radial length less than said first radial length.

16. A combustion seal ring for an engine comprising:

an annular section having a generally circular cross-section, said annular section being formed from a powdered metal alloy made up of titanium and an additional material, a portion of the additional material deposited as a residue to supply a lubricant to the finished seal ring.

17. A combustion seal ring as recited in claim 16, wherein said powdered metal alloy further includes iron and molybdenum to provide said lubricant.

18. A combustion seal ring as recited in claim 17, said powdered metal alloy having 4 percent iron and between 1 and 6 percent molybdenum.

* * * * *

UNITED STATES PATENT AND TRADEMARK OFFICE
CERTIFICATE OF CORRECTION

PATENT NO. : 5,454,574
DATED : October 3, 1995
INVENTOR(S) : Harry G. Willis, Jr. and Mark M. Shuster It is certified that error appears in the above-indentified patent and that said Letters Patent is hereby corrected as shown below:

Column 4, line 61, "compressire" is deleted and --compressive-- is inserted.

Signed and Sealed this

Twenty-eighth Day of November 1995

Attest:

BRUCE LEHMAN

*Attesting Officer*  *Commissioner of Patents and Trademarks*